CHARLES W. STICKNEY, OF ALBANY, NEW YORK.

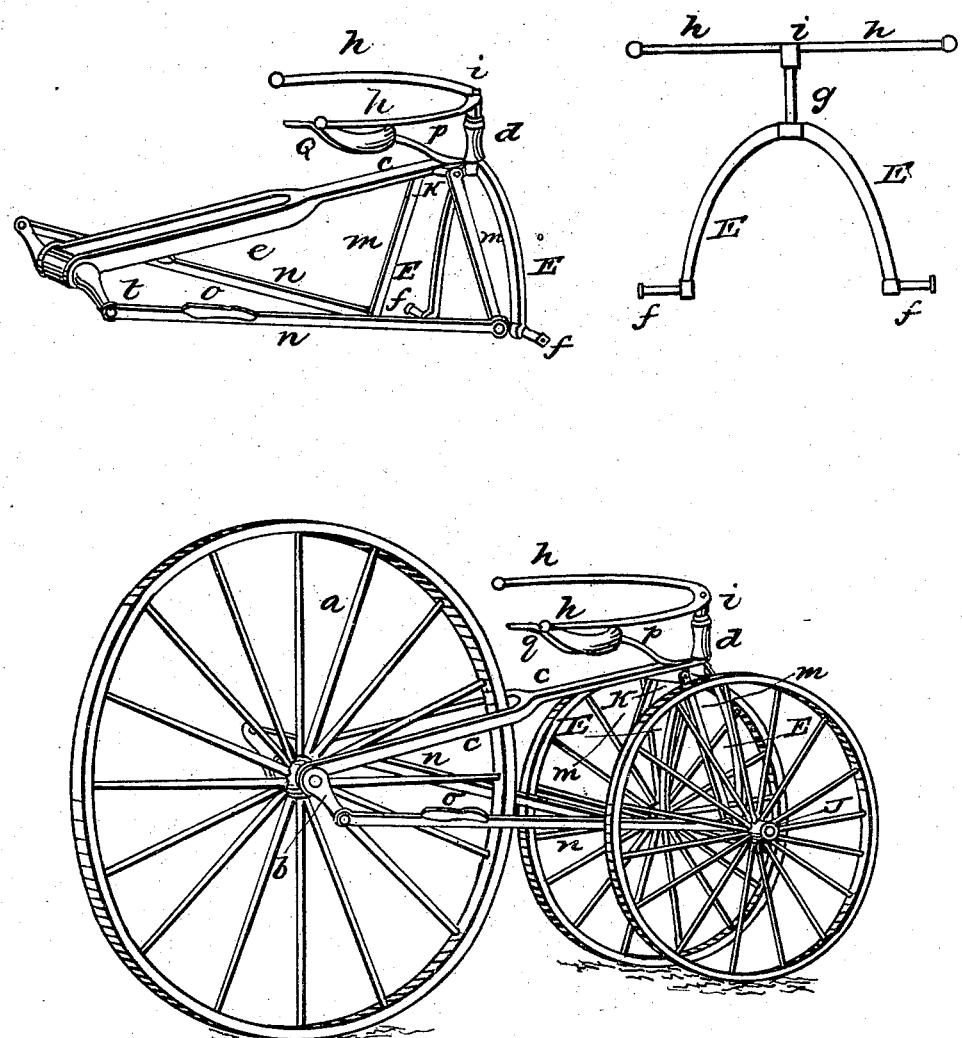

Letters Patent No. 88,750, dated April 6, 1869.

IMPROVEMENT IN VELOCIPEDES.

The Schedule referred to in these Letters Patent and making part of the same.

*To all whom it may concern:*

Be it known that I, CHARLES W. STICKNEY, of Albany, New York, have invented a new and improved Velocipede; and I do hereby declare that the following is a full and exact description of the construction and use thereof, reference being made to the accompanying drawings, and to the letters of reference marked thereon, making a part of this specification.

The nature of my invention consists in applying force to cranks set in a large front driving-wheel, by means of pedals, and steered by one or by two small wheels behind.

The advantages I claim are as follows:

First, that the saddle is low, bringing the weight of the body but little above the centre of the large wheel, thus securing less danger of tipping over.

Second, that the use of pedals makes it practicable to use a much larger driving-wheel than can be used where the feet are intended to rest directly on the cranks, (that method obliging the operator to straddle the driving-wheel down to a point below its centre,) yet preserving the advantage of a smooth circular movement and a direct leverage upon the cranks.

To enable others skilled in the art of machinery to make and use my invention, I describe its construction, as follows:

I make a large but light wheel, similar to a buggy wheel, $a$, say four feet in diameter, having cranks fixed in its hub, one on each side, $b$. This is the front and driving-wheel.

I attach to this wheel a forked iron bar, $c$, having at its hind end a socket, $d$, say five inches high.

The hind wheels are then joined together by a curved iron bar, $e$, having at its low ends axles for the wheels to run on, $f$, and at its centre and highest point an upright pin, $g$, which fits into the socket $d$ of the forked bar.

The machine is steered by the turning of this pin in the socket, and the consequent turning of the hind wheels, which turning the operator effects by means of two horizontal levers, $h$, attached to the top, $i$, of the pin, which projects above the socket, and extending forward and outward in a curve on each side of the seat, or saddle.

I make a small iron bar, $k$, say four inches long, and attach it horizontally across and at right angles to the forked bar, near the socket.

From the two projecting ends of this small bar $k$, I hang two swinging rods, say fifteen inches long, $m$.

The lower and loose ends of these rods I connect with the driving-wheel cranks, by means of two pedals, $n$, one on each side, which have thus a movement forward and backward and up and down, the two alternating in this movement.

Upon these pedals, near their connection with the cranks, I place treadles, for the feet to rest in, $o$.

I place upon the forked connecting-bar, between the front and hind wheels, a steel spring, $p$, and upon this spring a saddle, $q$.

To use the machine, sit upon the saddle, and with the feet in the treadles, make with each, alternately, a forward and downward movement, steering by pulling and pushing the levers.

In a three-wheeled velocipede, I claim the combination of the cranks $b$, pivoted to the rods $n$, having foot-rests $o$ attached thereto, pendent rods $m$, pivoted to the bifurcated reach $k$, and to the cranks $b$, in connection with the wheel $a$, running in the forked bar $c$.

CHARLES W. STICKNEY.

Witnesses:
    CHAS. W. LITTLE,
    ORVILLE B. TIFFANY.